United States Patent [19]

Cilano

[11] Patent Number: 5,433,673
[45] Date of Patent: Jul. 18, 1995

[54] DIFFERENTIAL WITH PIVOTABLE GEAR MOUNTINGS

[75] Inventor: Joseph E. Cilano, Bergen, N.Y.

[73] Assignee: Zexel Torsen Inc., Rochester, N.Y.

[21] Appl. No.: 282,622

[22] Filed: Jul. 29, 1994

Related U.S. Application Data

[63] Continuation-in-part of Ser. No. 58,480, May 6, 1993.

[51] Int. Cl.$^6$ .............................................. F16H 1/42
[52] U.S. Cl. ................................... 475/252; 475/249
[58] Field of Search ................................ 475/249, 252

[56] References Cited

U.S. PATENT DOCUMENTS

| | | |
|---|---|---|
| 1,938,649 | 12/1933 | Welsh . |
| 2,651,215 | 9/1953 | Schoenrock . |
| 2,754,694 | 7/1956 | Schoenrock . |
| 2,789,446 | 4/1957 | Schoenrock . |
| 2,859,641 | 11/1958 | Gleasman . |
| 2,972,265 | 2/1961 | Walter . |
| 3,292,456 | 12/1966 | Saari . |
| 3,375,736 | 4/1968 | Saari . |
| 3,706,239 | 12/1972 | Myers . |
| 3,738,192 | 6/1973 | Belansky . |
| 4,365,524 | 12/1982 | Dissett et al. . |
| 4,677,876 | 7/1987 | Dissett . |
| 4,890,511 | 1/1990 | Pedersen . |
| 4,950,215 | 8/1990 | Korner et al. . |
| 5,055,096 | 10/1991 | Riemscheid et al. . |
| 5,122,101 | 6/1992 | Tseng . |
| 5,147,252 | 9/1992 | Mace et al. . |
| 5,169,370 | 12/1992 | Dye et al. . |
| 5,232,415 | 8/1993 | Brewer et al. . |
| 5,244,440 | 9/1993 | Ichiki et al. . |
| 5,292,291 | 3/1994 | Ostertag . |
| 5,295,923 | 3/1994 | Takefuta . |
| 5,310,389 | 5/1994 | Sato . |
| 5,346,443 | 9/1994 | Crysler et al. . |

FOREIGN PATENT DOCUMENTS

| | | |
|---|---|---|
| 0130806 | 1/1985 | European Pat. Off. . |
| 0148641 | 7/1985 | European Pat. Off. . |
| 2216485 | 8/1974 | France . |
| 59-97346 | 6/1984 | Japan . |
| 431247 | 11/1992 | Japan . |
| 323933 | 1/1930 | United Kingdom . |
| 2212231 | 7/1989 | United Kingdom . |
| 2234791 | 2/1991 | United Kingdom . |

*Primary Examiner*—Edward K. Look
*Assistant Examiner*—James A. Larson
*Attorney, Agent, or Firm*—Eugene Stephens & Associates

[57] ABSTRACT

A parallel-axis gear differential (10) has planet gear pairs (46) separated by pivotable toggles (56). A leading member (48) of each planet gear pair (46) is angularly advanced in a forward drive direction (38) with respect to a following member (50) of each planet gear pair (46). First bearing surfaces (60) of the toggles (56) support the leading planet gears (48), and second bearing surfaces (62) support the following planet gears (50). Pivot axes (58) of the toggles (56) are positioned closer to one or the other bearing surfaces (60 or 62) to control force transmissions between the planet gear members (48 and 50).

25 Claims, 6 Drawing Sheets

DIFFERENTIAL WITH PIVOTABLE GEAR MOUNTINGS

RELATED APPLICATIONS

This is a continuation-in-part application of my copending U.S. application Ser. No. 08/058,480, filed 6 May 1993, entitled Gear Mounting System for Differential. My copending application is hereby incorporated by reference.

TECHNICAL FIELD

The invention relates to automotive differentials having gears mounted within housings for connecting an input shaft to a pair of output shafts and to movable mountings for supporting the gears within the housings.

BACKGROUND

Automotive differentials are positioned within drive lines for dividing engine drive power between two output shafts. Front and rear differentials respectively divide the engine power between the axle halves of front and rear axles, and center differentials divide the engine power between drive shafts to the front and rear axles.

A planetary gear set mounted within a differential housing interconnects the two output shafts for rotation in opposite directions with respect to the housing (i.e., differentiation). An input shaft delivers engine power to the housing for rotating the housing together with the planetary gear set about a common axis of the pair of output shafts.

Sun gear members of the planetary gear set, also referred to as "side gears" are coupled to inner ends of the output shafts. Planet gear members of the same set are positioned within the housing for transmitting power between the sun gears. For example, parallel-axis planetary gear sets include planet gears mounted in pairs for rotation about respective axes that extend parallel to the common axis of the output shafts and side gears. One portion of each planet gear meshes with one of the side gears, and another portion of each planet gear meshes with its paired planet gear.

Commonly assigned U.S. Pat. No. 5,122,101 to Tseng discloses a parallel-axis gear differential in which the planet gears are formed as so-called "combination" gears having main and transfer gear sections separated by a stem. The main gear section meshes both with one of the two side gears and with the transfer section of a paired combination gear. The transfer gear section meshes with the main gear section of the paired combination gear. The two meshes between paired combination gears straddle two meshes between the paired combination gears and the side gears.

Another known parallel-axis gear differential includes one combination gear member of each planet gear pair. The main gear section of the one combination gear member meshes with one of the two side gears, and the transfer gear section meshes with its paired planet gear. The single mesh between the paired planet gears overlaps one side of the two planet gear-to-side gear meshes.

The planet gears can be supported for rotation on shafts or within pockets formed in the housing. The shafts are received within bores that are also formed in the housing. The pockets provide bearings for supporting outside cylinder surfaces of the planet gears including top lands of the planet gear teeth. U.S. Pat. No. 5,244,440 to Ichiki et al., which is also commonly assigned, discloses such pockets as well as gearing relationships for maintaining preferred gear running positions within the pockets.

My parent U.S. application Ser. No. 08/058,480 discloses an alternative gear mounting system in which the planet gears are supported in pairs between pedestals. Each pedestal has two gear mounting surfaces for supporting one member from each of two adjacent pairs of planet gears. Gear reactionary forces can be transmitted between the pairs of planet gears by mounting the pedestals on pivots.

The planetary gearing interacts with its mounting surfaces to produce frictional torque that supports uneven distributions of drive torque between the two output shafts. The frictional torque opposes relative rotation between the output shafts (i.e., differentiation) proportional to a drive torque applied to the housing. Accordingly, drive torque is divided between relatively rotating output shafts in accordance with a so-called "bias ratio" which is expressed as a normalized ratio of the torque in the output shaft receiving more torque divided by the torque in the output shaft receiving less torque.

The resistance to differentiation can compensate for uneven amounts of traction available to a pair of drive wheels. For example, a bias ratio of two to one can distribute two times more torque to one drive wheel of a pair having higher traction than the other. This prevents the lower traction drive wheel from spinning with respect to its traction surface and provides for the delivery of more total torque.

The frictional torque opposing relative rotations of the output shafts is composed of a series of frictional torques developed at different frictional interfaces throughout the differential. However, patterns of loading at the frictional interfaces vary depending upon directions of torque transfer through the differential. For example, the loading patterns vary between forward drive loading and reverse drive loading. Opposite directions of differentiation also change loading patterns.

Different bias ratios can result from the different loading patterns. In some instances, such different bias ratios are desirable; and in other instances, they are undesirable. However, even when different bias ratios are desirable, each bias ratio can still have a preferred value. For example, one bias ratio can be preferred for forward drive loading and another bias ratio can be preferred for reverse drive loading. Different bias ratios can also be preferred in center differentials for independently controlling the percentages of torque that can be distributed to the front and rear axles during opposite directions of differentiation. In contrast, only one bias ratio is generally preferred for opposite directions of differentiation in front and rear differentials.

However, in most differentials, only limited possibilities exist for independently controlling bias ratios in the different directions of torque transfer. Most attempts for controlling bias ratios have thus far involved varying coefficients of friction between interfaces that are loaded differently between two or more directions of torque transfer. For example, co-assigned U.S. Pat. No. 4,890,511 to Pederson uses different coefficients of friction on opposite sides of a stationary washer to influence bias ratios in opposite directions of differentiation. Another co-assigned U.S. Pat. No. 5,232,415 to Brewer et al. uses different coefficients of friction at planet gear end faces to influence bias ratios both between opposite directions of differentiation and between forward and reverse drive.

SUMMARY OF INVENTION

My invention provides better control over bias ratios associated with different directions of torque transfer through automotive differentials. For example, movable gear mounting surfaces can be used to control bias ratios between forward and reverse loading. Variations in the gearing configuration with respect to the movable mounting surfaces can be used to control bias ratios associated with opposite directions of differentiation.

Similar to one of the differentials disclosed in my copending U.S. application Ser. No. 08/058,480, one embodiment of my present invention includes a housing that is rotatable in forward and reverse drive directions about a common axis of a pair of drive shafts. First and second side gears are positioned within the housing for receiving ends of the respective drive shafts. First and second pairs of planet gears are positioned within the housing in engagement with the side gears for rotation about axes that extend parallel to the common axis. The side and planet gears interconnect the drive shafts for rotation in opposite directions with respect to the housing.

Each of the pairs of planet gears includes a leading planet gear member and a following planet gear member. The leading planet gear member is angularly advanced in the drive direction about the common axis with respect to the following planet gear member.

A first toggle, also referred to as a pedestal, is pivotably mounted in the housing between the first and second pairs of planet gears. A first bearing surface of the first toggle rotationally supports the leading member of the first pair of planet gears, and a second bearing surface of the first toggle rotationally supports the following member of the second pair of planet gears. The first toggle is pivotable about a first pivot axis that also extends parallel to the common axis. Angular movement of the first toggle transmits gear reactionary forces between the first and second pairs of planet gears for applying a braking force to one of the members of the pairs.

The improvement of my present invention is made possible in part by a novel appreciation of the loading patterns exhibited by the leading and following planet gears in the different directions of torque transfer. In this regard, my present invention provides for positioning the first pivot axis closer to one of the first and second bearing surfaces than the other to vary a mechanical advantage of the force transmission between the leading and following planet gear members of adjacent planet gear pairs. First and second moment arms are defined between the pivot axis and respective normals at points of contact on the first and second bearing surfaces. The position of the pivot axis is selected to control the relative lengths of the two moment arms.

For example, the first pivot axis can be positioned closer to the first bearing surface than the second bearing surface for imbalancing the first toggle in favor of reactionary forces applied by the following planet gear. When the reactionary force of the following planet gear is larger than the reactionary force of the leading planet gear, which is the case in the forward drive direction, a larger braking force is applied to the leading planet gear. However, when the reactionary force of the following planet gear is smaller than the reactionary force of the leading planet gear, which is the case in the reverse drive direction, a smaller braking force is applied to the following planet gear. Since the braking force applied by the first toggle is higher in the forward drive direction than in the reverse drive direction, the bias ratio in the forward drive direction is increased with respect to the bias ratio in the reverse drive direction.

A second toggle can be similarly mounted about a second pivot axis between the first and second pairs of planet gears. A first bearing surface of the second toggle rotationally supports the leading member of the second pair of planet gears, and a second bearing surface of the second toggle rotationally supports the following member of the first pair of planet gears. The second pivot axis is also positioned closer to one of the first and second bearing surfaces of the second toggle than the other and, in accordance with the instant example, closer to the first bearing surface than the second bearing surface for increasing bias ratio in the forward drive direction with respect to the reverse drive direction.

The first and second pivot axes could also be positioned closer to the second instead of the first bearing surfaces of the first and second toggles for increasing bias ratio in the reverse drive direction with respect to the forward drive direction. More than two pivotable toggles and more than two pairs of planet gears could also be used. Then, of course, the second toggle would transmit reactionary forces between the first or second and a third pair of planet gears instead of between the first and second pair.

Within each pair of planet gears, one of the leading and following members meshes with the first side gear and the other of the leading and following members meshes with the second side gear. However, different meshing orders can be used between pairs of planet gears. For example, bias ratio imbalances between opposite directions of differentiation can be minimized by meshing the leading member of the first pair of planet gears with the first side gear and by meshing the leading member of the second pair of planet gears with the second side gear. Even numbers of additional pairs of planet gears can be arranged in a similar alternating order. Alternatively, such bias ratio imbalances can be enhanced by meshing the leading members of both pairs of planet gears with the first side gear.

DRAWINGS

DETAILED DESCRIPTION

Figure 1:
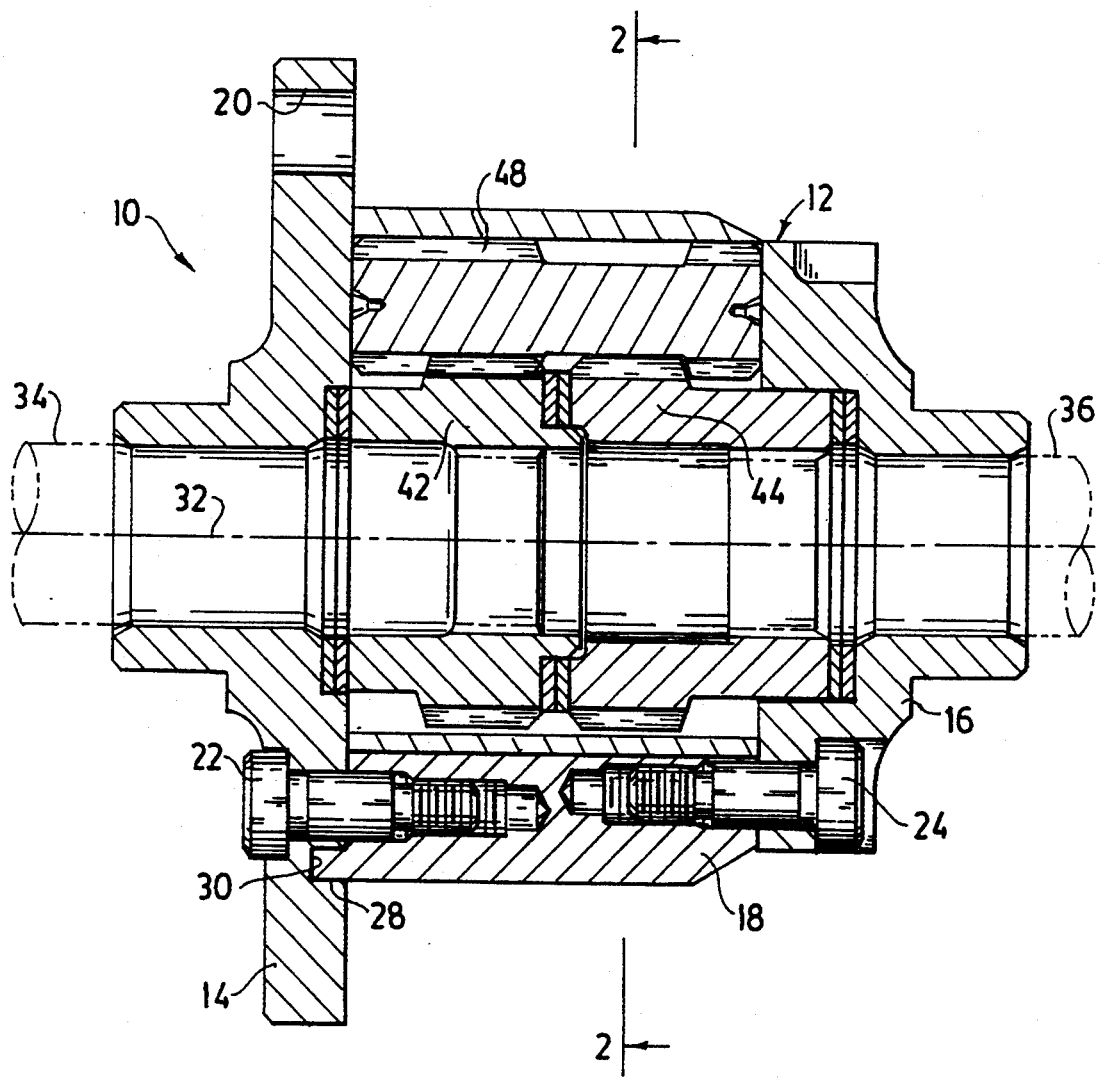
FIG. 1 is an axial sectional view along line 1—1 of FIG. 2 through a parallel-axis gear differential modified in accordance with my invention.
Figure 2:
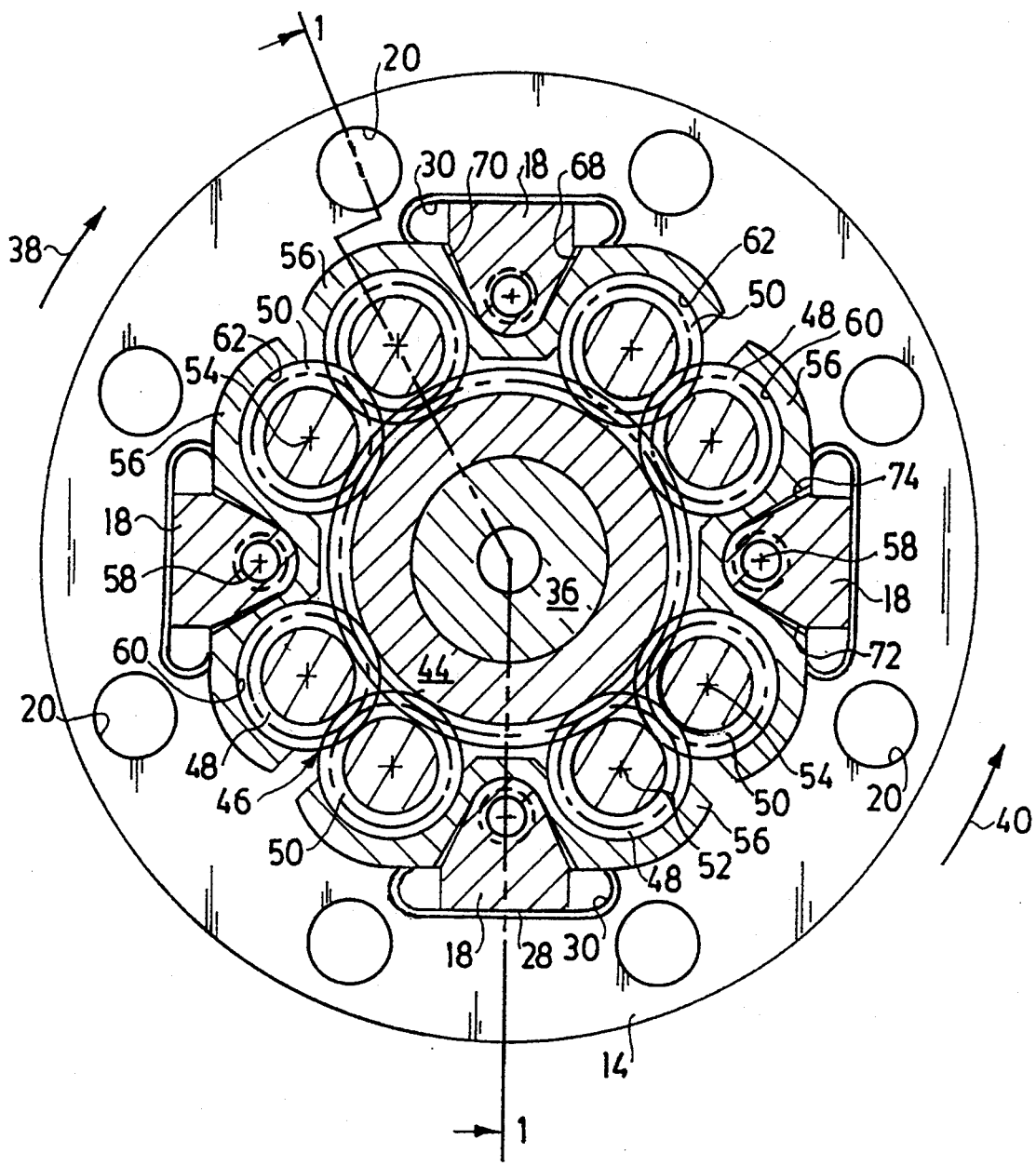
FIG. 2 is a transverse sectional view along line 2—2 of FIG. 1 through the same differential.
Figure 3:
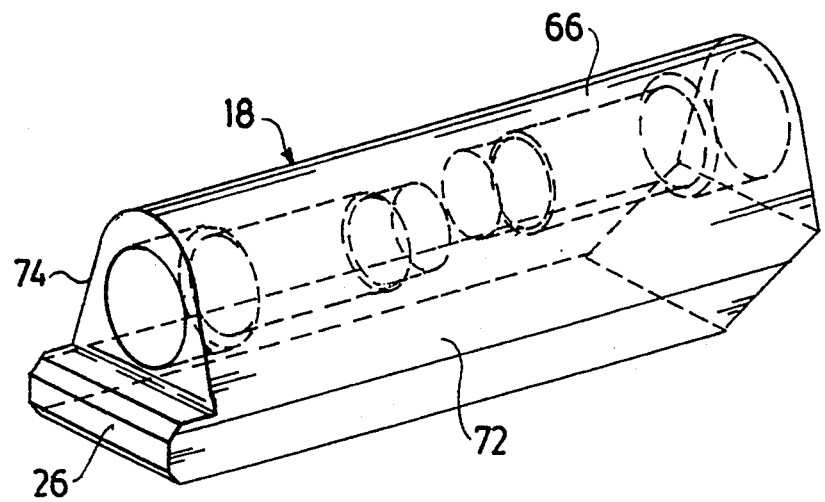
FIG. 3 is a perspective view of one of four support columns shown in FIGS. 1 and 2.

Illustrated by FIGS. 1 and 2 is a parallel-axis gear differential 10 that includes a housing 12 having a flange end 14 and a cap end 16 joined by four columns 18. The flange end 14 has holes 20 for mounting a ring gear (not shown) that transmits drive power to the housing 12. Non-aligned bolts 22 and 24 join the columns 18 to the flange end 14 and cap end 16. Key-like projections 26 of the columns 18 (shown also in FIG. 3) have flat locating faces 28 that mate with side walls of slots 30 in the flange end 14. Both the non-aligned bolts 22 and 24 and the mating projections 26 and slots 30 prevent the columns 18 from rotating.

The housing 12 is rotatable about a common axis 32 of a pair of output shafts 34 and 36 in forward 38 and reverse 40 drive directions. Side gears 42 and 44 are coupled to inner ends of the two output shafts 34 and 36 for rotation therewith about the common axis 32. The side gears 42 and 44 are interconnected by four pairs of planet gears 46, each pair having a leading planet gear member 48 and a following planet gear member 50 rotatable about respective axes 52 and 54 that extend parallel to the common axis 32. The leading planet gear member 48 is angularly advanced about the common axis 32 in the forward drive direction 38 with respect to the following planet gear member 50.

Figure 4:
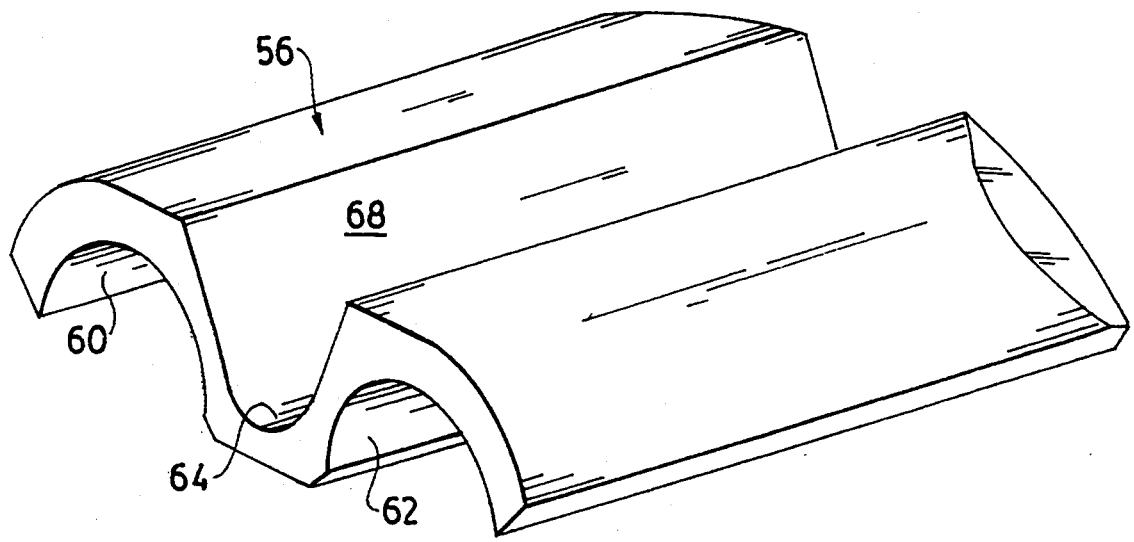
FIG. 4 is a perspective view of one of four toggles that are pivotably mounted on the support columns for mounting adjacent pairs of planet gears.

Four toggles 56 are pivotally mounted on the columns 18 for angular movement about pivot axes 58 that also extend parallel to the common axis 32. Each of the toggles 56 (shown also in FIG. 4) has a first bearing surface 60 for rotationally supporting the leading member 48 of one of the planet gear pairs and a second bearing surface 62 rotationally supporting the following member 50 of an adjacent planet gear pair.

A journal portion 66 of the columns 18 mates with a third bearing surface 64 of the toggles 56 for pivotally mounting the toggles 56 within the housing 12. Clearance surfaces 68 and 70 of the toggles 56 are angularly spaced with respect to column faces 72 and 74 to permit a range of angular movement about the pivot axes 58. Alternatively, one of the column faces 72 or 74 could be positioned to form a stop for limiting movement of the toggles 56 in one direction about the pivot axes 58.

In this embodiment, the pivot axes 58 are positioned closer to the first bearing surfaces 60 than the second bearing surfaces 62 for favoring transmissions of planetary gear reactionary forces from the following members 50 to the leading members 48 of the adjacent pairs of planet gears. However, the pivot axes could also be positioned closer to the second bearing surfaces 62 than the first bearing surfaces 60 to have the opposite effect.

Force diagrams in FIGS. 5-8 illustrate the effects of different pivot axis positions in both forward and reverse drive loading directions. In both drive directions, power is transmitted from the differential housing 12 to the output shafts 34 and 36. In contrast, power is transmitted from the output shafts 34 and 36 to the housing 12 in both forward and reverse coast directions. Thus, the terms "forward" and "reverse" refer to opposite directions of housing rotation, and the terms "drive" and "coast" refer to opposite directions of power transfer between the housing 12 and the output shafts 34 and 36. These distinctions are important because differential loading patterns in the forward drive direction are similar to loading patterns in the reverse coast direction, and loading patterns in the reverse drive direction are similar to loading patterns in the forward coast direction.

Figure 5:
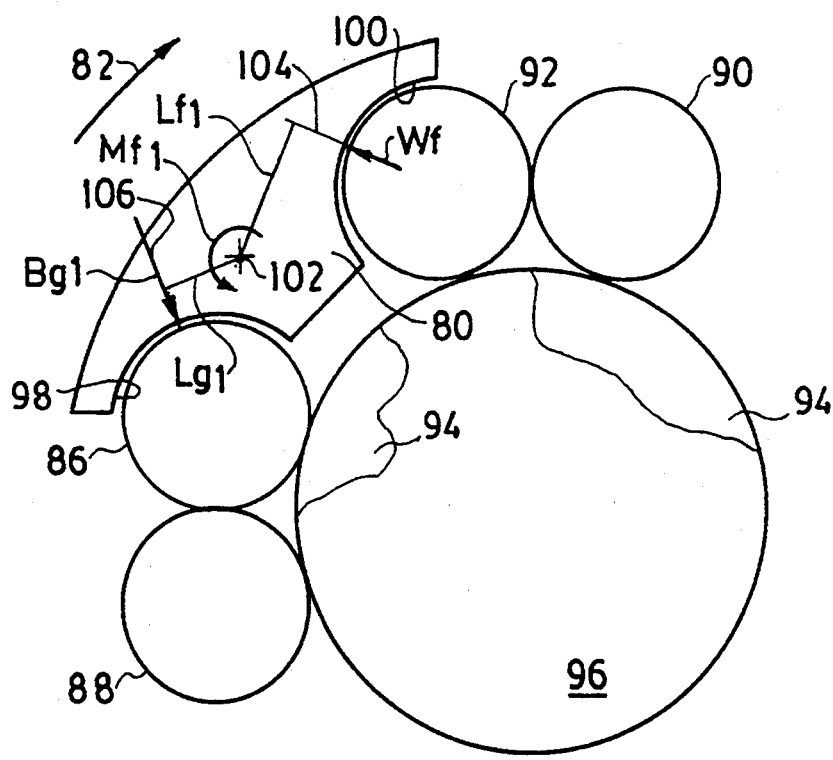
FIG. 5 is a diagram in axial section of part of a similar differential depicting forces and moments affecting a toggle having a pivot axis positioned closer to one of two gear bearing surfaces and loaded in a forward drive or reverse coast direction.
Figure 6:
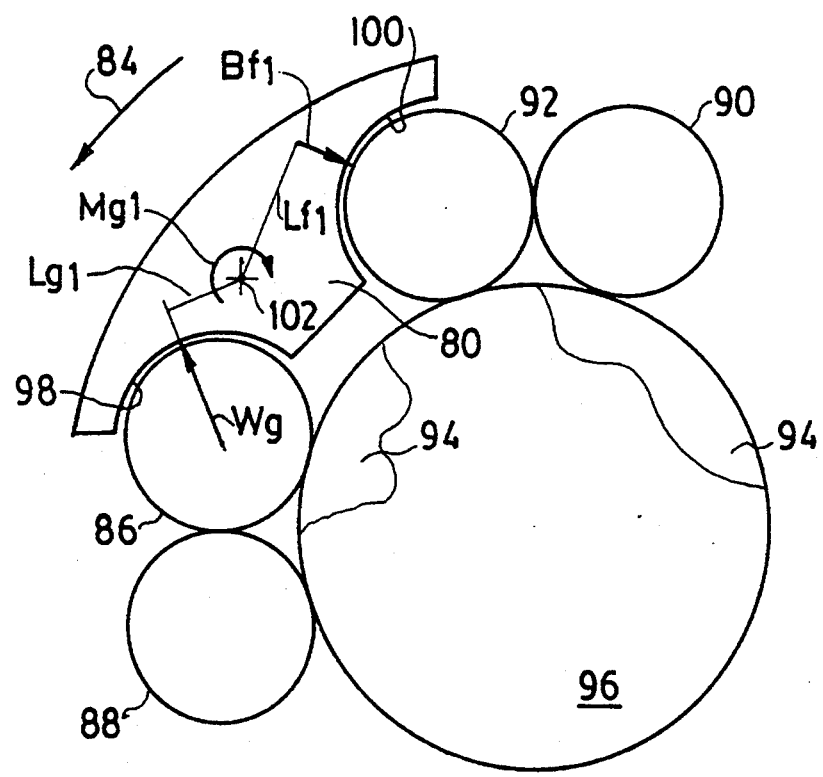
FIG. 6 is a similar diagram of the toggle in FIG. 5 loaded in the reverse drive or forward coast direction.

For example, FIG. 5 depicts performance of a toggle 80 in the forward drive (or reverse coast) direction 82, and FIG. 6 depicts the performance of the same toggle in the reverse drive (or forward coast) direction 84. The toggle 80 separates a first pair of leading and following planet gear members 86 and 88 from a second pair of leading and following planet gear members 90 and 92. The leading members 86 and 90 of both planet gear pairs mesh with side gear 94 and the following members 88 and 92 mesh with side gear 96.

The toggle 80 includes a first bearing surface 98 for rotationally supporting the leading planet member 86 and a second bearing surface 100 for rotationally supporting the following planet member 92. A pivot axis 102, which is positioned closer to the first bearing surface 98 than the second bearing surface 100, pivotally supports the toggle 80 within a housing (not shown).

In the forward drive loading direction 82 (shown in FIG. 5), the following planet members 88 and 92 exhibit high gear reactionary forces and the leading planet members 86 and 90 exhibit low gear reactionary forces. This is because reactionary forces generated by meshes of the following planet members 88 and 92 with the side gear 96 and with the leading planet members 86 and 90 are additive, whereas the reactionary forces generated by meshes of the leading planet members 86 and 90 with the side gear 94 and with the following planet members 88 and 92 are subtractive.

Just the opposite loading pattern occurs in the reverse drive direction 84 (shown in FIG. 6). That is, the leading planet members 86 and 90 exhibit high gear reactionary forces and the following planet members 88 and 92 exhibit low gear reactionary forces. Co-assigned U.S. Pat. No. 5,244,440 to Ichiki et al. discloses procedures for calculating these gear reactionary forces, and this patent is incorporated by reference.

According to FIG. 5 in which loading is applied in the forward drive direction 82, the following planet member 92 applies a radial reactionary force "$W_f$" against the second bearing surface 100. The reactionary force "$W_f$" produces a moment "$M_{f1}$" through the toggle 80 about the pivot axis 102. The moment "$M_{f1}$" (neglecting friction about the pivot axis 102) is calculated as a product of the reactionary force "$W_f$" and a moment arm distance "$L_{f1}$", which is measured between the pivot axis 102 and a normal 104 to the second bearing surface 100 at a point of contact with the following planet member 92.

The moment "$M_{f1}$" transmits the reactionary force "$W_f$" through the first bearing surface 98 as a braking force "$B_{g1}$" against the leading planet member 86 The braking force "$B_{g1}$" is calculated as a quotient of the moment "$M_{f1}$" divided by a moment arm distance "$L_{g1}$", which is measured between the pivot axis 102 and a normal 106 coincident to the braking force "$B_{g1}$". Thus, magnitudes of the reactionary force "$W_f$" and braking force "$B_{g1}$" are in inverse proportion to their respective moment arm distances "$L_{f1}$" and "$L_{g1}$".

Since the moment arm "$L_{f1}$" is longer than the moment arm "$L_{g1}$", the braking force "$B_{g1}$" applied to the leading planet member 86 is increased with respect to the gear reactionary force "$W_f$" in the forward drive loading direction 82. The increased braking force "$B_{g1}$", which generates a frictional torque opposing rotation of the leading planet member 86, increases bias ratios in the forward drive (or reverse coast) loading direction 82.

According to FIG. 6 in which loading is applied in the reverse drive direction 84, the leading planet member 86 applies a radial reactionary force "$W_g$" against the first bearing surface 98. The reactionary force "$W_g$" produces a moment "$M_{g1}$" through the toggle 80 about the pivot axis 102. The moment "$M_{g1}$" transmits the reactionary force "$W_g$" through the second bearing surface 100 as a braking force "$B_{f1}$" against the following planet member 92.

Since the pivot axis 102 has not moved, the lengths of moment arms "$L_{f1}$" and "$L_{g1}$" are unchanged in FIG. 6. Accordingly, the braking force "$B_{f1}$" applied to the following planet member 92 is decreased with respect to the gear reactionary force "$W_g$". The relatively decreased braking force "$B_{f1}$" decreases bias ratios in the reverse drive loading direction 84.

Thus, a result of positioning the pivot axis 102 closer to the first bearing surface 98 than the second bearing surface 100 is an increase in bias ratios in the forward drive (or reverse coast) loading direction 82 with respect to bias ratios in the reverse drive (or forward coast) loading direction 84. The amount of relative increase can be adjusted by controlling the relative lengths of moment arms "$L_{f1}$" and "$L_{g1}$".

Figure 7:
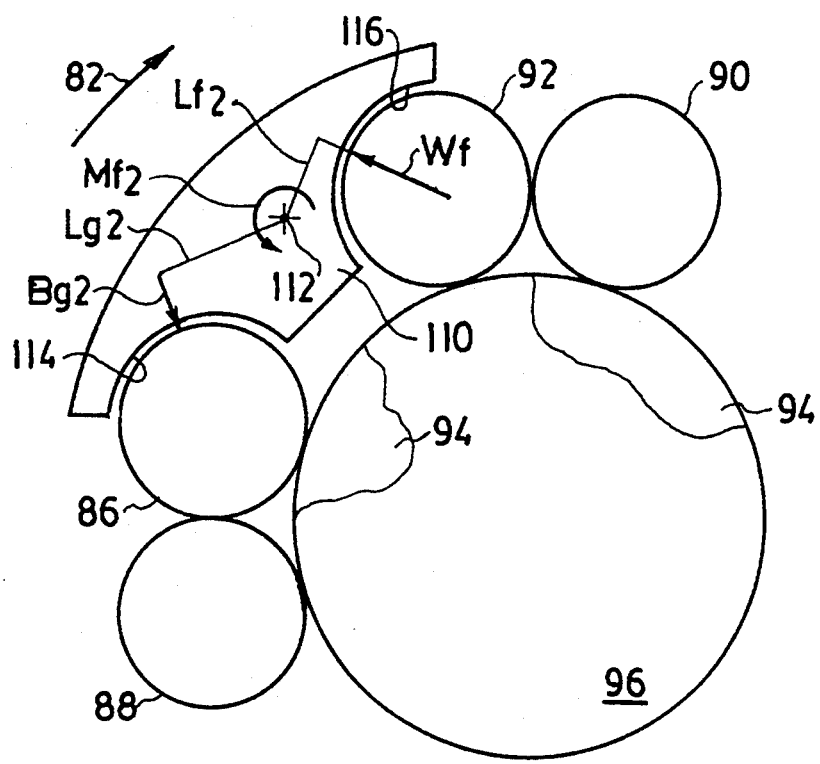
FIG. 7 is a similar diagram of a toggle having a pivot axis positioned closer to the other of the two gear bearing surfaces and loaded in the forward drive or reverse coast direction.
Figure 8:
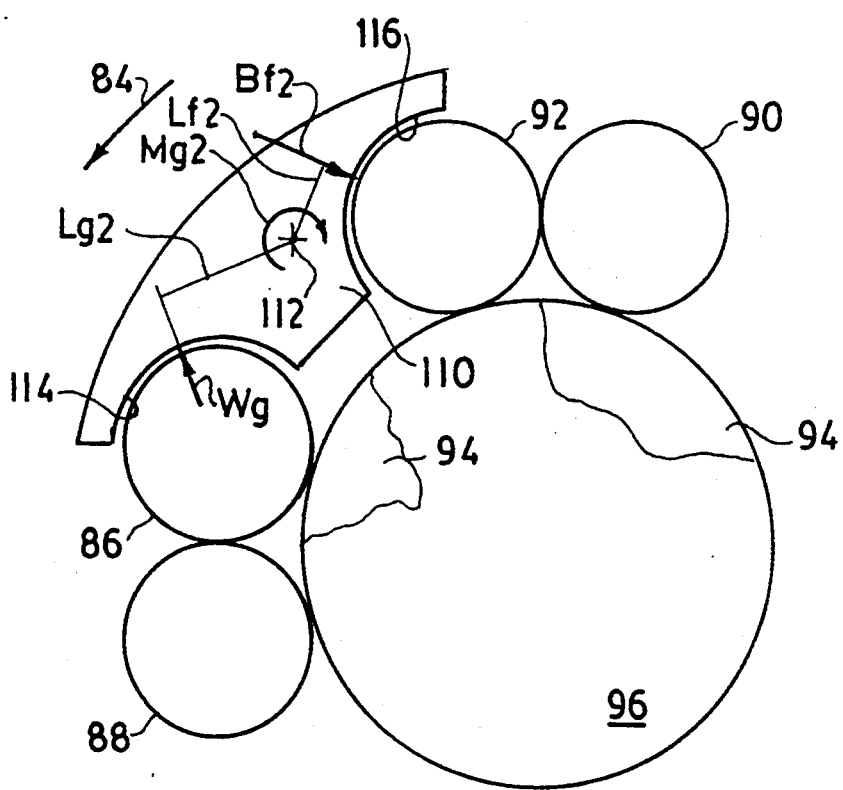
FIG. 8 is a similar diagram of the toggle in FIG. 7 loaded in the reverse drive or forward coast direction.

FIGS. 7 and 8 depict performances of a toggle 110 in both the forward drive direction 82 and the reverse drive direction 84. The same gearing is illustrated as in FIGS. 5 and 6; only the toggle 110 and the location of a pivot axis 112 are changed.

Also similar to FIGS. 5 and 6, the toggle 110 of FIGS. 7 and 8 has a first bearing surface 114 for rotationally supporting the leading planet member 86 and a second bearing surface 116 for rotationally supporting the following planet member 92. However, the pivot axis 112 is positioned closer to the second bearing surface 116 than the first bearing surface 114.

In FIG. 7, the reactionary force "$W_f$" is transmitted by a moment "$M_{f2}$" through the toggle 110 and is applied as a reduced braking force "$B_{g2}$" against the leading planet member 86. The braking force "$B_{g2}$" is related to the reactionary force "$W_f$" in inverse proportion to the lengths of moment arms "$L_{g2}$" and "$L_{f2}$". The reduction in the braking force "$B_{g2}$" with respect to the reactionary force "$W_f$" reduces bias ratios in the forward drive loading direction 82.

In FIG. 8, the reactionary force "$W_g$" is transmitted by a moment "$M_{g2}$" through the toggle 110 and is applied to the following planet member 92 as an increased braking force "$B_{f2}$". The increase in braking force "$B_{f2}$" with respect to the reactionary force "$W_g$" increases bias ratios in the reverse drive loading direction 84.

Accordingly, movement of the pivot axis 112 toward the second bearing surface 116 has the effect of reducing bias ratios in the forward drive (or reverse coast) loading direction 82 with respect to bias ratios in the reverse drive (or forward coast) loading direction 84. These bias ratio effects, as discussed for FIGS. 5–8, can be used to compensate for other bias ratio imbalances within differentials or to impose such imbalances between the two loading directions 82 and 84.

Bias ratios in either loading direction 82 or 84 can be further relatively reduced by preventing pivoting of the toggles 80 or 110 in one of two opposite directions. For example, the column faces 72 or 74, first shown in FIG. 2, can be positioned against the clearance surfaces 68 or 70 of the toggles 56 for accomplishing this.

Figure 9:
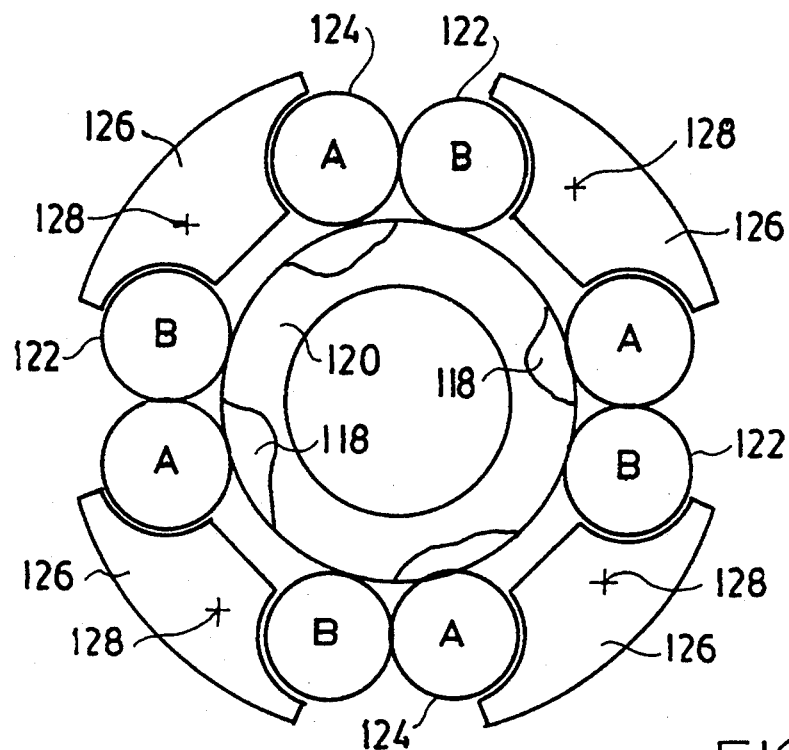
FIG. 9 is a diagram showing an arrangement of planet gear pairs for increasing a bias ratio imbalance between opposite directions of differentiation.
Figure 10:
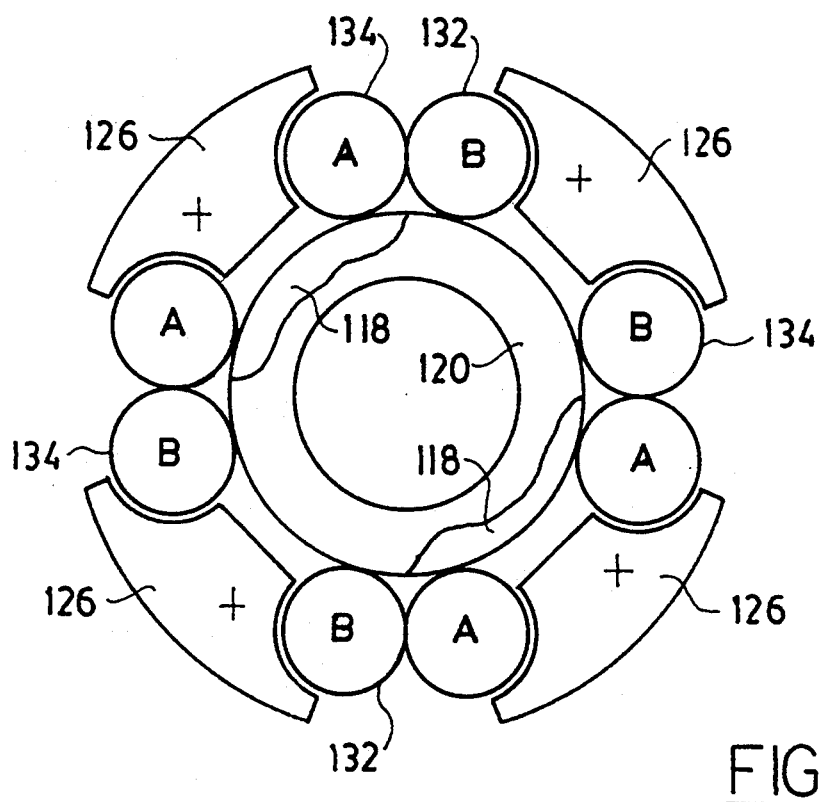
FIG. 10 is a diagram similar to FIG. 9 but showing an arrangement for reducing a bias ratio imbalance between opposite directions of differentiation.

FIGS. 9 and 10 show planet gear arrangements for balancing and imbalancing bias ratios between opposite directions of differentiation. Planet gears that mesh with a first side gear 118 are labeled "A", and planet gears that mesh with a second side gear 120 are labeled "B".

In FIG. 9, four pairs of leading and following planet gears 122 and 124 are radially supported by four pivotable toggles 126. The pivot axis 128 of each toggle 126 is positioned closer to the leading planet gears 122 than the following planet gears 124. All of the leading planet gears 122, as designated by the letter "B", mesh with the second side gear 120; and all of the following planet gears, as designated by the letter "A", mesh with the first side gear 118.

If the planet gears "A" or "B" associated with one or the other side gears 118 and 120 experience higher reactionary or braking forces, then a bias ratio imbalance can be generated between opposite directions of differentiation. The position of the pivot axis 128 in FIG. 9 provides for braking the leading planet gears 122 more than the following planet gears 124. Since all of the leading planet gears 122 mesh with the second side gear 120, a bias ratio imbalance can be imposed between opposite directions of differentiation.

In FIG. 10, equal numbers of leading and following planet gears 132 and 134 alternate being in mesh with the first side gear 118 and second side gear 120. For example, two of the leading gears 132 and two of the following gears 134, all designated as "A" mesh with the first side gear 118. Each of the toggles 126 transmits gear reactionary forces between planet gears designated as either "A" or "B". Since there is an even number of toggles 126, their effect is evenly distributed between the planet gears "A" and "B" associated with the first and second side gears 118 and 120. This reduces bias ratio imbalances between opposite directions of differentiation.

Many other combinations of pivot axis positions and planet gear meshing orders are possible to control bias ratio imbalances. For example, the pivot axes could be alternately positioned closer to the leading or following planet gears. Odd numbers of planet gear pairs could also be used to promote imbalances. The columns that define the pivot axes could also be formed by pins.

I claim:

1. A parallel-axis gear differential comprising:
   a housing rotatable in forward and reverse drive directions about a common axis of rotation of a pair of drive shafts;
   first and second side gears positioned within said housing for receiving ends of the respective drive shafts for rotation therewith about said common axis;
   first and second pairs of planet gears positioned within said housing in engagement with said side gears for rotation about respective axes that extend parallel to said common axis of rotation;
   each of said pairs of planet gears including a leading planet gear member and a following planet gear member;

said leading planet gear member being angularly advanced in said forward drive direction about said common axis with respect to said following planet gear member of each pair;

a first toggle having first and second bearing surfaces and being mounted in said housing between said first and second pairs of planet gears;

said first bearing surface of the first toggle rotationally supporting said leading member of the first pair of planet gears;

said second bearing surface of the first toggle rotationally supporting said following member of the second pair of planet gears;

said first toggle being pivotable about a first pivot axis that extends parallel to said planet gear axes for transmitting a gear reactionary force between said leading and following members of the first and second pairs of planet gears; and said first pivot axis being positioned closer to one than the other of said first and second bearing surfaces for varying a mechanical advantage of the force transmission between the leading and following members of the first and second planet gear pairs.

2. The differential of claim 1 in which said first toggle applies a braking force to said leading member of the first planet gear pair in response to transmission of torque in the forward drive direction and applies a braking force to said following member of the second planet gear pair in response to transmission of torque in the reverse drive direction.

3. The differential of claim 2 in which said pivot axis of said first toggle is positioned closer to said first bearing surface than said second bearing surface to increase said braking force applied to the leading member in the forward drive direction with respect to said braking force applied to said following member in the reverse drive direction.

4. The differential of claim 2 in which said pivot axis of said first toggle is positioned closer to said second bearing surface than said first bearing surface to decrease said braking force applied to the leading member in the forward drive direction with respect to said braking force applied to said following member in the reverse drive direction.

5. The differential of claim 2 in which both said leading member of the first pair of planet gears and said following member of the second pair of planet gears mesh with said first side gear.

6. The differential of claim 2 in which said leading members of the first and second pairs of planet gears mesh with said first side gear.

7. The differential of claim 1 further comprising a second toggle and a third pair of planet gears having leading and following members.

8. The differential of claim 7 in which said second toggle has a first bearing surface rotationally supporting said leading member of the second planet gear pair and a second bearing surface rotationally supporting said following member of the third planet gear pair, and said second toggle is pivotable about a second axis that extends parallel to said planet gear axes.

9. The differential of claim 8 in which said second pivot axis is positioned closer to one than the other of said first and second bearing surfaces of the second toggle.

10. The differential of claim 9 in which both said first and second pivot axes are positioned closer to said first bearing surface than to said second bearing surface of the first and second toggles for increasing frictional resistance to differentiation in the forward drive direction with respect to the reverse drive direction.

11. The differential of claim 9 in which both said first and second pivot axes are positioned closer to said second bearing surface than to said first bearing surface of the first and second toggles for increasing frictional resistance to differentiation in the reverse drive direction with respect to the forward drive direction.

12. The differential of claim 9 further comprising third and fourth toggles pivotable about respective third and fourth axes and a fourth pair of planet gears having leading and following members.

13. The differential of claim 12 in which an even number of said planet gear pairs are supported by an equal number of said toggles.

14. The differential of claim 13 in which two of said leading members mesh with said first side gear and two other of said leading members mesh with said second side gear.

15. A differential system comprising:

a housing rotatable about a common axis of rotation of a pair of drive shafts;

first and second side gears positioned within said housing for receiving ends of the respective drive shafts for rotation therewith about said common axis;

at least two pairs of planet gears positioned within said housing in engagement with said side gears for rotation about respectively parallel axes;

each of said pairs of planet gears including first and second planet gear members;

a toggle pivotable about an axis that extends parallel to said planet gear axes;

a first bearing surface of said toggle sustaining a first force at a point of contact with said first member of one of the planet gear pairs;

a second bearing surface of said toggle sustaining a second force at a point of contact with said second member of another of the planet gear pairs;

a third bearing surface of said toggle for pivotably supporting said first and second bearing surfaces about said pivot axis;

a first moment arm extending from said pivot axis normal to said first force;

a second moment arm extending from said pivot axis normal to said second force; and said first moment arm being longer than said second moment arm for increasing a magnitude of the second force with respect to a magnitude of the first force.

16. The system of claim 15 in which said housing is rotatable in forward and reverse drive directions about said common axis and said side and planet gears generate within said housing frictional forces that resist relative rotation of the drive shafts.

17. The system of claim 16 in which said first planet gear members are angularly advanced in said forward drive direction about the common axis with respect to said second planet gear members.

18. The system of claim 17 in which said pivot axis is closer to said axis of the first planet gear member in contact with said first bearing surface than to said axis of the second planet gear member in contact with said second bearing surface for increasing frictional resistance to relative drive shaft rotation in said forward drive direction with respect to said reverse drive direction.

19. The system of claim 17 in which said pivot axis is closer to said axis of the second planet gear member in contact with said second bearing surface than to said axis of the first planet gear member in contact with said first bearing surface for decreasing frictional resistance to relative drive shaft rotation in said forward drive direction with respect to said reverse drive direction.

20. The system of claim 17 in which both said first planet gear member in contact with the first bearing surface and said second planet gear member in contact with the second bearing surface mesh with said first side gear.

21. The system of claim 17 in which said first planet gear member in contact with the first bearing surface meshes with said first side gear and said second planet gear member in contact with the second bearing surface meshes with said second side gear.

22. A parallel-axis gear differential comprising:
a housing rotatable in forward and reverse drive directions about a common axis of rotation of a pair of drive shafts;
first and second side gears positioned within said housing for receiving ends of the respective drive shafts for rotation therewith about said common axis;
first and second pairs of planet gears positioned within said housing in engagement with said side gears for rotation about respective axes that extend parallel to said common axis of rotation;
each of said pairs of planet gears including a leading planet gear member and a following planet gear member;
said leading planet gear member being angularly advanced in said forward drive direction about said common axis with respect to said following planet gear member of each pair;
a first toggle having first and second bearing surfaces and being mounted in said housing between said first and second pairs of planet gears;
said first bearing surface of the first toggle rotationally supporting said leading member of the first pair of planet gears;
said second bearing surface rotationally supporting said following member of the second pair of planet gears;
said first toggle being pivotable about a first pivot axes that extends parallel to said planet gear axis for transmitting gear reactionary forces between said leading and following members of the first and second pairs of planet gears; and
said leading member of the first pair of planet gears and said following member of the second pair of planet gears meshing with said first side gear.

23. The differential of claim 22 in which said following member of the first pair of planet gears and said leading member of the second pair of planet gears mesh with said second side gear.

24. The differential of claim 23 further comprising third and fourth pairs of planet gears having leading and following members.

25. The differential of claim 24 in which two of said leading members mesh with said first side gear and two other of said leading members mesh with said second side gear.

* * * * *